United States Patent [19]

Sekiguchi

[11] Patent Number: 5,190,368
[45] Date of Patent: Mar. 2, 1993

[54] FOUR LAMP TYPE HEADLAMP

[75] Inventor: Tsuneo Sekiguchi, Tokyo, Japan
[73] Assignee: Stanley Electric Co., Ltd., Tokyo, Japan
[21] Appl. No.: 846,818
[22] Filed: Mar. 6, 1992

[30] Foreign Application Priority Data

Mar. 22, 1991 [JP] Japan .................................. 3-83551

[51] Int. Cl.⁵ .............................................. B60Q 1/04
[52] U.S. Cl. ........................................ 362/61; 362/80; 362/268; 362/277
[58] Field of Search ............... 362/61, 80, 268, 277, 362/282, 319, 322, 351, 214

[56] References Cited

U.S. PATENT DOCUMENTS

| | | | |
|---|---|---|---|
| 4,895,693 | 1/1990 | Suzuki et al. | 362/61 |
| 5,047,903 | 9/1991 | Choji | 362/61 |
| 5,089,942 | 2/1992 | Sekiguchi | 362/61 |
| 5,111,368 | 5/1992 | Suzuki et al. | 362/61 |

Primary Examiner—Ira S. Lazarus
Assistant Examiner—Y. Quach
Attorney, Agent, or Firm—Frishauf, Holtz, Goodman & Woodward

[57] ABSTRACT

A four lamp type headlamp in which two headlamp units each having two lighting fixtures are symmetrically arranged on left and right front end sides of a vehicle such that distribution light of running (high) beams and distribution light of pass-each-other (low) beam can be switched with each other. One of the two lighting fixtures in each headlamp unit is a projector type fixture and is formed to be switchable between the distribution light of the pass-each-other beams and the running beams. The other lighting fixture in each headlamp unit is always lit and forms a portion of the pass-each-other beams. During driving with the running beams, one lighting fixture in each headlamp unit provides the running beams while the other lighting fixture in each headlamp unit remains in an "ON" state (lit). When driving with the pass-each-other beams, distribution light for the pass-each-other beams is provided by light from the four lighting fixtures.

10 Claims, 3 Drawing Sheets

FOUR LAMP TYPE HEADLAMP

BACKGROUND OF THE INVENTION

1. Field of the Invention

The present invention relates to a four lamp type headlamp for a vehicle, and to a method of constructing such a headlamp of the four lamp type.

2. Description of the Prior Art

FIG. 5 (prior art) shows two lamps of a four lamp type headlamp of a conventional type. One lighting fixture 91 called a type 1 fixture is formed for exclusive use for providing a running beam light distribution (high beam) whereas the other lighting fixture 92 called a type 2 fixture is formed to be switchable between a running beam light distribution and a pass-each-other beam light distribution (low beam). In use, during driving with the running beams in the suburbs or the like, both lighting fixtures 91 and 92 are lit to produce running beams, whereas during driving with the pass-each-other beams, one lighting fixture 91 is turned off and the other lighting fixture 92 is lit to produce a pass-each-other beam light distribution.

However, the aforementioned conventional headlamp is designed principally on the basis of driving with the running beam light distribution as will be apparent from the fact that both lighting fixtures 91 and 92 are formed to provide a running beam light distribution. This does not meet the present traffic conditions which requires driving with the pass-each-other beams under almost all conditions owing to traffic congestion caused by popularization of automobiles and the progress in road illumination. This problem should be solved.

SUMMARY OF THE INVENTION

For solving the aforesaid problem of the prior art, the present invention provides a four lamp type headlamp arrangement in which two lighting fixtures are symmetrically arranged on left and right sides of a vehicle and wherein the distribution light of the running beams and the distribution light of pass-each-other beams can be switched with each other. One of the two lighting fixtures at each side of the vehicle is of the projection type and is formed to be switchable between the distribution light of the running beams and the distribution light of the pass-each-other beams, while the other lighting fixture at each side of the vehicle is formed for exclusive use to always provide the pass-each-other beams. During driving, both lighting fixtures at a side of the vehicle are lit to produce either the running beams or the pass-each-other beams.

This configuration suits the present traffic conditions to solve the problems noted above with respect to the prior art.

DESCRIPTION OF THE PREFERRED EMBODIMENTS

Figure 1:
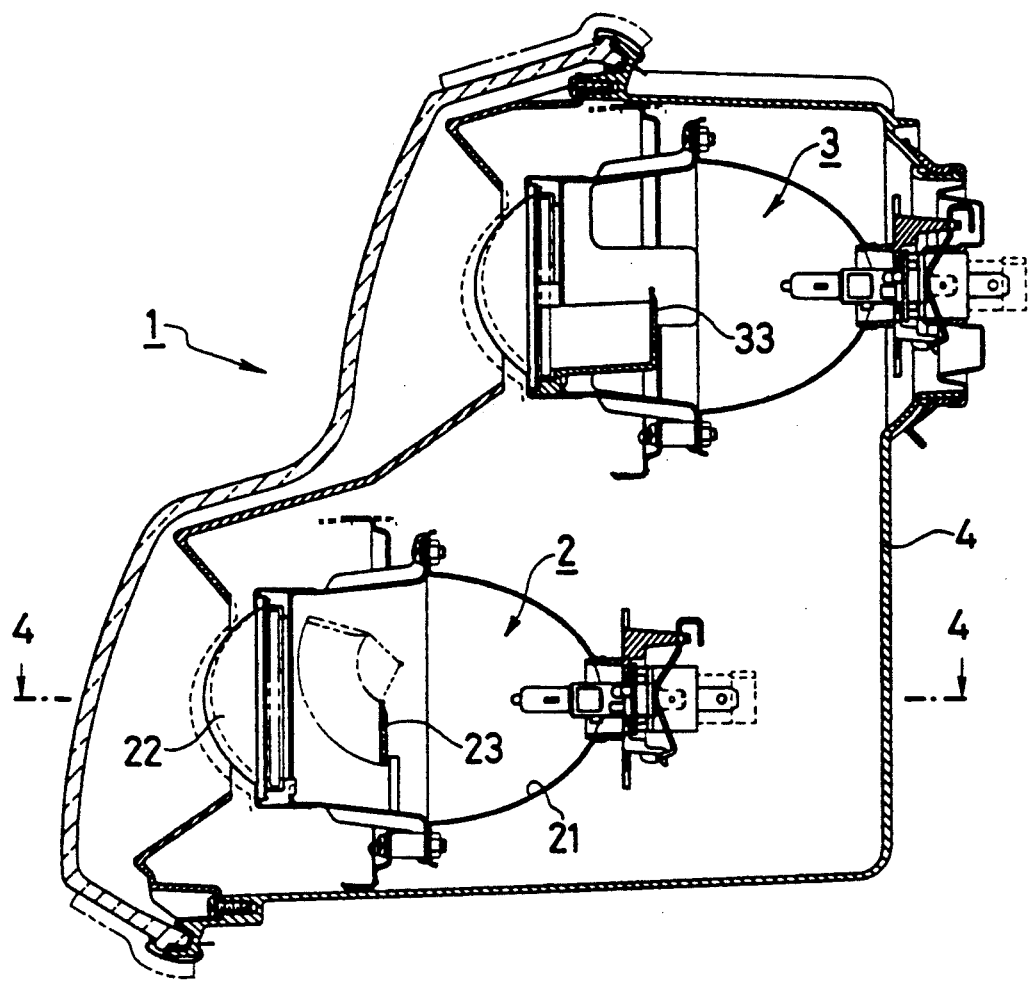
FIG. 1 is a sectional view showing one embodiment of a four lamp headlamp according to the present invention.

The present invention will now be described on the basis of one embodiment shown in the drawings.

In FIG. 1, reference numeral 1 designates a headlamp unit according to the present invention. In this headlamp unit 1, a pair of lighting fixtures 2 and 3 are arranged on one side of an automobile, and a similar structure to that shown in FIG. 1 is disposed on the other side of the automobile to thereby constitute a four lamp type headlamp arrangement similar to the conventional example.

According to the present invention, either one of the lighting fixtures 2 or 3, for example, one lighting fixture 2 comprises a reflecting mirror 21 of an elliptic system such as a rotary elliptic surface, a projection lens 22 and a shield plate 23. The shield plate 23 is provided so as to be insertable into a reflecting light path from the reflecting mirror 21 and to be removed therefrom. When shield plate 23 is moved out of the light path (as shown in dashed lines in FIG. 1), the light distribution 2M of running beams (see FIG. 2) is obtained. When the shield plate 23 is inserted into the light path, a pass-each-other beam light distribution 2S (see FIG. 3) is obtained.

On the other hand, the other lighting fixtures 3 is of the projector type similar to the lighting fixture 2. In the lighting fixture 3, the shield plate 33 is fixed so that the lighting fixture 3 is formed for exclusive use to provide a pass-each-other light beam distribution 3S (see FIGS. 2 and 3). That is fixture 3 always provides a pass-each-other beams light distribution.

Figure 2:
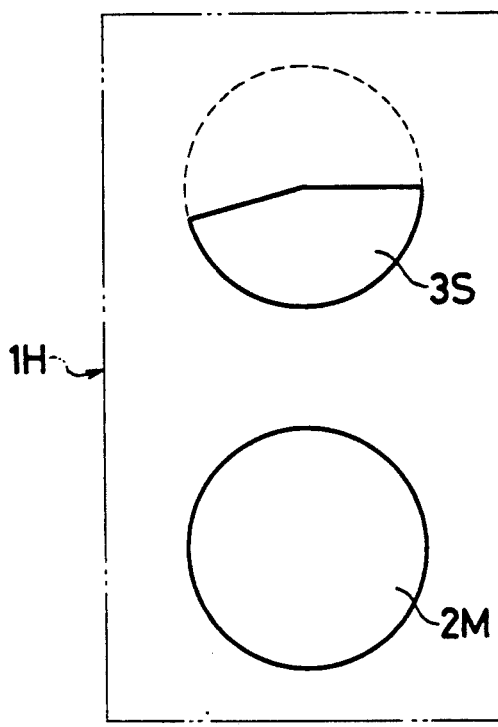
FIG. 2 is an explanatory view showing the lighting state when the running beams are lit in the embodiment shown in FIG. 1.
Figure 3:
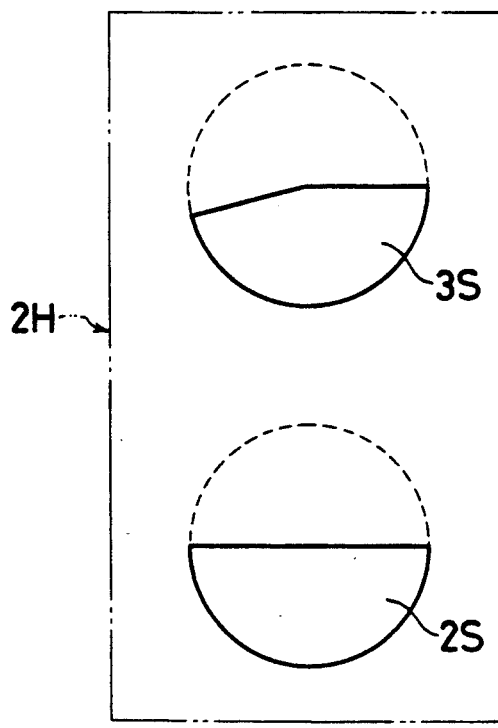
FIG. 3 is an explanatory view showing the lighting state when the pass-each-other beams are lit in the embodiment shown in FIG. 1.

FIGS. 2 and 3 show the state in which the lighting fixtures 2 and 3 constructed as described above are combined for use. When driving with the running beam 1H (FIG. 2) in the suburbs or the like is required, the shield plate 23 is removed from the light path and the lighting fixture 2 provides a running beam light distribution 2M, and at the same time, the other lighting fixture 3 provides a pass-each-other beam light distribution 3S.

When driving with the pass-each-other beam 2H in the streets or the like is required, as shown in FIG. 3, the shield plate 23 is inserted into the light path, and the lighting fixture 2 provides a pass-each-other beam light distribution 2S, and at the same time, the other lighting fixture 3 also provides a pass-each-other beam light distribution 3S.

While in the aforementioned description describes, an example in which both lighting fixtures 2 and 3 are of the projector type, it is to be noted that the lighting fixture 3 is not limited thereto but, for example, the lighting fixture 3 may be comprise a rotary elliptic reflecting mirror and a filament whose lower half portion is covered.

Figure 4:
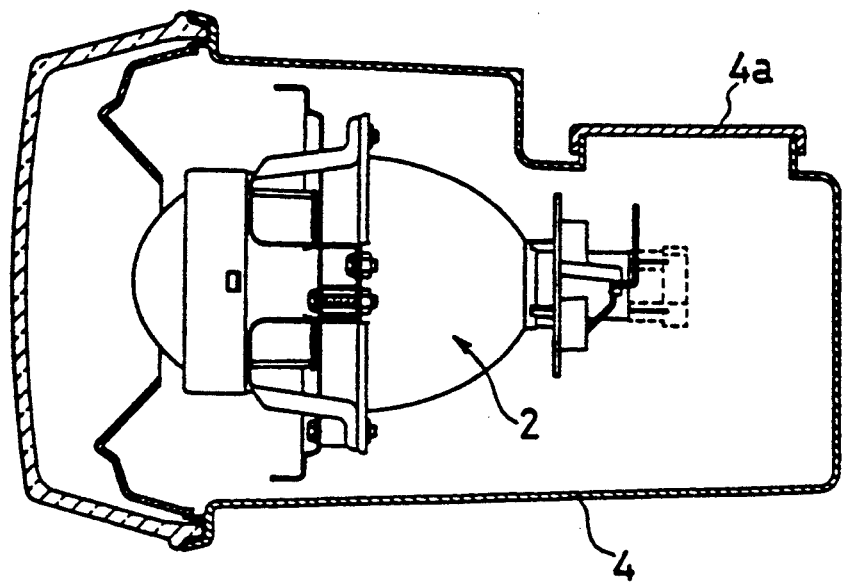
FIG. 4 is a sectional view taken on line 4-4 of FIG. 1.
Figure 5:
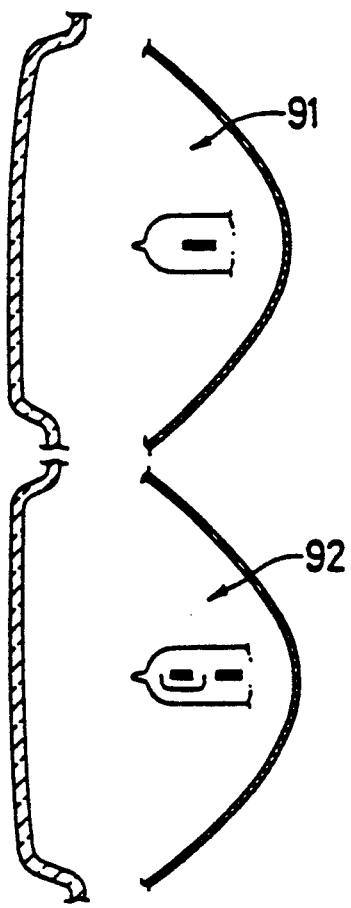
FIG. 5 is a sectional view showing a prior art lighting unit.

Further, if both lighting fixtures are of the projector type and arranged above and below each other as shown in FIG. 1, then they can also be arranged to be deviated in position (one forward of the other) depending on the design of the vehicle. In this case it will be difficult to replace a bulb of the lower lighting fixture 2. Therefore, the lower lighting fixture 2 is advantageously provided with a replacing hole 4a on a side of a housing 4, as shown in FIG. 4.

The function and effect of the headlamp 1 according to the present invention, constructed as described above, will now be explained. One lighting fixture 2 is made to be switchable between the distribution light of the running beams 2M and the distribution light of the pass-each-other beams 2S whereas the other lighting fixture 3 is formed for exclusive use of distribution light of the pass-each-other beams. In lighting, both of lighting fixtures 2 and 3 are always simultaneously lit. With this arrangement, when driving with the pass-each-other beams (which is the present normal state), both lighting fixtures 2 and 3 illuminate the road surface with the distribution light of the pass-each-other beams 2S and 3S (see FIGS. 2 and 3). For example, during driving in dark conditions with the pass-each-other beams, road lighting would be relatively dark because of the provision of the shield plates 23 and 33. However, lighting can be bright end by lighting two lamps (i.e., lighting fixtures 2 and 3). Since one lighting fixture 2 is a projector type fixture, the shape of the distribution light of pass-each-other beams 2S can be set optimally by changing the position of the shield plate 23, for example, because projector type fixtures have a large freedom of movement when compared with the other systems.

When driving with the running beams, the lighting fixture 3 provides lighting with the distribution light of the pass-each-other beams 3S. In this state, the distribution light of the running beams 2M constitutes no obstacle to practical use, since the running beams illuminates the nearby road surface brightly to provide a light distribution which is convenient for driving.

As described above, according to the present invention, there is provided a four lamp type headlamp in which one lighting fixture is made to be switchable between distribution light of the running beams and distribution light of the pass-each-other beams, whereas the other lighting fixture is formed to be used exclusively for the pass-each-other beams. In lighting, distribution light for the running beams is provided by one lighting fixture on each side of the vehicle. The distribution light for the pass-each-other beams is provided by lighting both lighting fixtures on each side of the vehicle simultaneously. With this arrangement, first, the distribution light for the pass-each-other beams (which is the main use in driving at present) is made brighter to enhance visibility. Secondly, four lamps are always lit to impart to an on-coming vehicle a feeling of constant vehicle-width to prevent a mistake, thus contributing to the enhancement of traffic safety.

I claim:

1. A four lamp type headlamp arrangement in which two lighting fixtures are respectively arranged in first and second headlamp units, respectively positioned on a left and right front side of a vehicle, and wherein a distribution light of a plurality of running beams and a distribution light of a plurality of pass-each-other beams provided by said first and second headlamp units, are switchable with each other, comprising:

one of said tow lighting fixtures in each of said first and second headlamp units being a projector type fixture that is switchable between the distribution light of a pass-each-other beam and the distribution light of a running beam;

the other one of said two lighting fixtures in said first and second headlamp unit providing at all times a pass-each-other beam; and wherein:

when a plurality of running beams are in an "ON" state, said one of said two lighting fixtures in both said first and second headlamp units are switched to provide the distribution light for said plurality of running beams; and when the plurality of pass-each-other beams are in an "ON" state, said one of said two lighting fixtures in both said first and second headlamp units are switched to provide the distribution light for said plurality of said pass-each-other beams while the other one of said two lighting fixtures in both said first and second headlamp units are also in an "ON" state to provide respective pass-each-other beams, whereby said pass-each-other beams are provided by lighting all four lighting fixtures in both of said first and second headlamp units.

2. The four lamp type headlamp arrangement according to claim 1, wherein one of said two lighting fixture in each of said first and second headlamp units comprises an elliptic reflecting mirror, a projection mirror and a shield plate.

3. The four lamp type headlamp arrangement according to claim 1, wherein said other one of said two lighting fixtures in each of said first and second headlamp units comprises an elliptic reflecting mirror and a filament having a lower half portion that is covered.

4. The headlamp four lamp type arrangement according to claim 1, wherein said one of said two lighting fixtures in each of said first and second headlamp units comprises a bulb replacing access opening.

5. A four lamp type headlamp arrangement, comprising:

two lighting fixtures arranged in each of a first and a second headlamp unit, said first and second headlamp units being positioned respectively on a left and on a right front side of a vehicle;

at least one of said two lighting fixtures in each of said first and second headlamp units comprising a projector type headlamp the is in an "ON" state at all times when said first and second headlamp units are in an "ON" state, said projector type headlamp being selectively switchable between a running beam and a pass-each-other beam;

the other one of said two lighting fixtures in each of said first and second headlamp units being in an "ON" state at all times when said first and second headlamp units are in an "ON" state;

light distribution control means in each of said first and second headlamp units, for controlling a distribution of light to form the running beam when the running beam is selectively switched to an "ON" state; and whereby the four lighting fixtures int eh first and second headlamp units are in an "ON" state when one of the pass-each-other beam and the running beam is switched to an "ON" state and the light distribution control means changes the light distribution from said at least one of said two lighting fixtures in each headlamp unit to form the running beam when the running beam is switched to an "ON" state.

6. A method for operating a four headlamp lighting system of a movable vehicle, in which four headlamps are arranged in a first and a second headlamp unit, each having two lighting fixtures therein, said first and second headlamp units being respectively arranged on a left nd on a right front side of the movable vehicle for selectively providing a pass-each-other beam and a running beam, said method comprising the steps of:

maintaining an "ON" operational state for all four lighting fixtures of said first and second headlamp units when both of the running beam and the pass-each-other beam are in an "ON" operational state; and selectively controlling a light distribution, from at least one of the two lighting fixtures in each of said first and second headlamp units, to change a light distribution from each of said headlamp units to thereby provide the running beam.

7. The method according to claim 6, wherein the selectively controlling step comprises:

inserting a light deflection means into a light distribution beam path from said at least one of the two lighting fixtures in each of said first and second headlamp units for changing the light distribution from said at least one of the two lighting fixtures in each of said first and second headlamp units, to thereby provide said pass-each-other beam.

8. The method according to claim 7, further comprising forming at least a portion of the pass-each-other beam by keeping at least a portion of the light defection means out of the light distribution beam path from said at least one of the two lighting fixtures.

9. The method according to claim 7, wherein the inserting step comprises moving a movable shield plate into the light distribution beam path from said at least one of the two lighting fixtures.

10. The method according to claim 6, wherein the selectively controlling step comprises:

inserting into each headlamp unti a lighting fixture having a lighting lighting filament including a top and a bottom portion; and covering the bottom portion of said lighting filament to thereby change a light distribution eminating from said filament.

* * * * *

UNITED STATES PATENT AND TRADEMARK OFFICE
CERTIFICATE OF CORRECTION

PATENT NO. : 5,190,368
DATED : March 2, 1993
INVENTOR(S) : Tsuneo SEKIGUCHI

It is certified that error appears in the above-indentified patent and that said Letters Patent is hereby corrected as shown below:

Title page:
Item [54] Title, insert --A-- before "FOUR".

Item [57] Abstract, line 6, "beam" should be --beams--.

Column 1, line 22, "other beams" should be --other-beams--.

Column 2, line 6, "d ® scribed" should be --described--.

Column 4, line 16, (claim 2), "fixture" should be --fixtures--.

Column 4, line 25, (claim 4), "The headlamp four lamp type" should be --The four lamp type headlamp--.

Column 4, line 52, (claim 5), "int eh" should be --in the--.

Column 4, line 66 (claim 6), "nd" should be --and--.

Column 6, line 14 (claim 10), "unti" should be --unit--.

Column 6, line 19 (claim 10), insert --lighting-- before "filament".

Signed and Sealed this

Twelfth Day of April, 1994

BRUCE LEHMAN

*Commissioner of Patents and Trademarks*

*Attest:*

*Attesting Officer*